United States Patent
Kaneda et al.

(10) Patent No.: US 6,834,289 B2
(45) Date of Patent: Dec. 21, 2004

(54) INFORMATION PROCESSING SYSTEM AND STORAGE AREA ALLOCATING METHOD

(75) Inventors: Yasunori Kaneda, Tokyo (JP); Hiroshi Arakawa, Tokyo (JP); Yoshiaki Eguchi, Tokyo (JP); Kazuhiko Mogi, Tokyo (JP); Kouji Arai, Tokyo (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 09/944,462

(22) Filed: Aug. 30, 2001

(65) Prior Publication Data

US 2003/0004981 A1 Jan. 2, 2003

(30) Foreign Application Priority Data

Jul. 2, 2001 (JP) ........................................ 2001-200455

(51) Int. Cl.⁷ .............................................. G06F 17/30
(52) U.S. Cl. ........................ 707/204; 707/10; 707/203; 709/223; 709/247
(58) Field of Search ........................... 707/1, 4, 10, 100, 707/104, 204, 203; 709/223, 245, 227, 247

(56) References Cited

U.S. PATENT DOCUMENTS

| | | | | |
|---|---|---|---|---|
| 5,950,203 A | * | 9/1999 | Stakuis et al. ................. | 707/10 |
| 6,070,150 A | * | 5/2000 | Remington et al. ............ | 705/34 |
| 6,351,776 B1 | * | 2/2002 | O'Brien et al. ............... | 709/245 |
| 6,687,765 B2 | * | 2/2004 | Surugucchi et al. .......... | 710/15 |

OTHER PUBLICATIONS

Tivoli Systems, Inc., "Vision: Tivoli® Storage Management Solutions for the Information Grid" (© 2000), title page, notice of copyright, Table of Contents and pp. 4–54.

* cited by examiner

*Primary Examiner*—Charles Rones
(74) *Attorney, Agent, or Firm*—Townsend and Townsend and Crew LLP

(57) ABSTRACT

A plurality of storages having respective attributes and a method for preserving data is provided in consideration of the attribute (performance or cost) and the operation ratio of the storage and the using frequency of the data in the storage area network. The information processing system of the invention includes a location management unit for managing a location of the data stored in the storage, an information duplication unit for duplicating the data between the storages, and an attribute preservation unit for preserving information for representing the attribute of each storage. The location management unit duplicates and moves the data between the storages by using the information duplication unit, based on the operation ratio of the storage, the access frequency of the data, the control information and the billing information.

17 Claims, 15 Drawing Sheets

FIG. 2

| # | FILE NAME | WRITE BIT | READ COUNT | CONTROL INFORMATION | GROUP ID | LOCATION INFORMATION 1 | | | | LOCATION INFORMATION 2 | | | | ... | LOCATION INFORMATION n | FILE HISTORY |
|---|---|---|---|---|---|---|---|---|---|---|---|---|---|---|---|---|
| | | | | | | EFFECTIVE BIT | WWN | MEDIUM NUMBER | LBA | DATA LENGTH | EFFECTIVE BIT | WWN | MEDIUM NUMBER | LBA | DATA LENGTH | | |
| 1 | | | | | | | | | | | | | | | | ... | |
| 2 | | | | | | | | | | | | | | | | ... | |
| ⋮ | | | | | | | | | | | | | | | | | |
| m | | | | | | | | | | | | | | | | ... | |

811

| # | WWN | MEDIUM NUMBER | LBA |||||||||||||
|---|---|---|---|---|---|---|---|---|---|---|---|---|---|---|---|
| | | | 0 | 1 | 2 | 3 | 4 | 5 | 6 | 7 | 8 | 9 | 10 | 11 | | n |
| 1 | 201 | | 0 | 0 | 0 | 0 | 0 | 0 | 0 | 0 | 0 | 0 | 0 | 0 | ... | 0 |
| 2 | 202 | | 0 | 0 | 0 | 0 | 0 | 0 | 0 | 0 | 0 | 0 | 0 | 0 | ... | 0 |
| 3 | 203 | | 0 | 0 | 0 | 0 | 0 | 0 | 0 | 0 | 0 | 0 | 0 | 0 | ... | 0 |

| # | WWN | MEDIUM NUMBER | LBA |||||||||||||
|---|---|---|---|---|---|---|---|---|---|---|---|---|---|---|---|
| | | | 0 | 1 | 2 | 3 | 4 | 5 | 6 | 7 | 8 | 9 | 10 | 11 | | m |
| 4 | 301 | 0 | 0 | 0 | 0 | 0 | 0 | 0 | 0 | 0 | 0 | 0 | 0 | 0 | ... | 0 |
| 5 | 301 | 1 | 0 | 0 | 0 | 0 | 0 | 0 | 0 | 0 | 0 | 0 | 0 | 0 | ... | 0 |
| 6 | 301 | 2 | 0 | 0 | 0 | 0 | 0 | 0 | 0 | 0 | 0 | 0 | 0 | 0 | ... | 0 |
| 7 | 301 | 3 | 0 | 0 | 0 | 0 | 0 | 0 | 0 | 0 | 0 | 0 | 0 | 0 | ... | 0 |

812

INFORMATION PROCESSING SYSTEM AND STORAGE AREA ALLOCATING METHOD

BACKGROUND OF THE INVENTION

The present invention relates to a technology on use of a storage device (such as a disk array system, a hard disk, a tape library system or an optical disk library unit) in an information processing system, and more particularly to the technology on the use of a plurality of storage devices having respective characteristics in a plurality of controllers (computers).

As a technology arranged so that a plurality of computers (controllers) may share a storage device, today, a storage area network is widely used. Before the storage area network, it is not considered that the file system software running in the computer system is arranged so that a plurality of computers may share one storage device. In a case that such file system software is shared in the storage area network environment, the data (information) recorded in the storage device may be lost. U.S. Pat. No. 5,950,203 describes the technology of overcoming this shortcoming.

The foregoing prior art, however, discloses the technology on how a plurality of computers may share the storage device, while it does not disclose the way of using the storage system if the storage devices have respective attributes (performance, reliability, conservation, cost per one capacity unit, and so forth).

In this respect, the white paper of Tivoli Systems Inc. "Vision, Tivoli Storage Management Solutions for the Information Grid" introduces the technology on storage of data as using the storage devices with their respective attributes in a storage area network. Even this white paper, however, does not disclose the method of managing the attributes of the storage devices, the method of managing data in the location management unit, the method of billing a user for the storage of data, and so forth.

On the other hand, there exists a business called a Storage Service Provider (SSP). The SSP provides a storage fitted for each customer's request as an outsourcing. By entrusting the management of the storage onto the SSP, the customer enables to reduce the cost on preserving and managing the storage. The SSP needs to not only manage the storage volume but also respond to the performance, the reliability, the cost and the endurance to failure requested by each customer. Further, the SSP itself needs to keep the performance and the reliability as well as reduce the cost on preserving and managing the storage.

SUMMARY OF THE INVENTION

It is an object of the present invention to provide a method of preserving data by considering an attribute (performance or cost), an operation ratio, and a access frequency of data in a storage area network composing a plurality of storages having respective attributes, the method implemented by a business aspect such as a storage service provider.

In carrying out the foregoing object, the information processing system according to the present invention includes a location management unit for managing a location of data stored in a storage device (that will be basically referred simply to as a storage), an information duplication unit for duplicating data from one storage to another, and an attribute preservation unit for preserving attribute information for representing an attribute of each storage. This attribute preservation unit may be provided in each storage. Based on the attribute information preserved in this attribute preservation unit, the location management unit performs location management for writing and reading data.

Further, the location management unit preserves two or more pieces of location information of data corresponding to a file name (data identifier for indicting where the information is located) given from a computer. This makes it possible to preserve a plurality of data units in different storages with respect to one file name.

Further, an operation ratio is also provided for measuring an operation ratio of the storage. The location management unit performs the location management of the data to be written, the location management of the written data, and the location management of the data to be read out on the basis of this operation ratio. This operation ratio measurement unit may be provided in each storage.

Moreover, the location management unit preserves the access frequency of the data and the control information thereof (rules of data duplication and data movement set by a user) corresponding with the file name given from the computer. The control information may be set on each data unit by the computer. It may be pre-set by the location management unit.

Moreover, the location management unit preserves the movement and duplication histories of the data in correspondence with the file name given from the computer. Further, it preserves the price information in the attribute preservation unit. This makes it possible for the location management unit to duplicate and move the data from one storage to another through the use of the data duplication unit, based on the operation ratio of the storage, the access frequency of the data, the control information, or the price information.

Moreover, the location management unit preserves a group ID of the data in correspondence with the file name given from the computer. The location management unit performs the duplication and the movement of the data on the basis of the group ID.

In addition, the computer provides a data acceptance unit for accepting data to be transferred from the information duplication unit and a storage for storing the accepted data.

BRIEF DESCRIPTION OF THE DRAWINGS

FIG. 2 is a table showing a conversion table;

DESCRIPTION OF THE EMBODIMENT

Hereafter, the first embodiment (with no cache) of the invention will be described with reference to the appended drawings.

Figure 1:
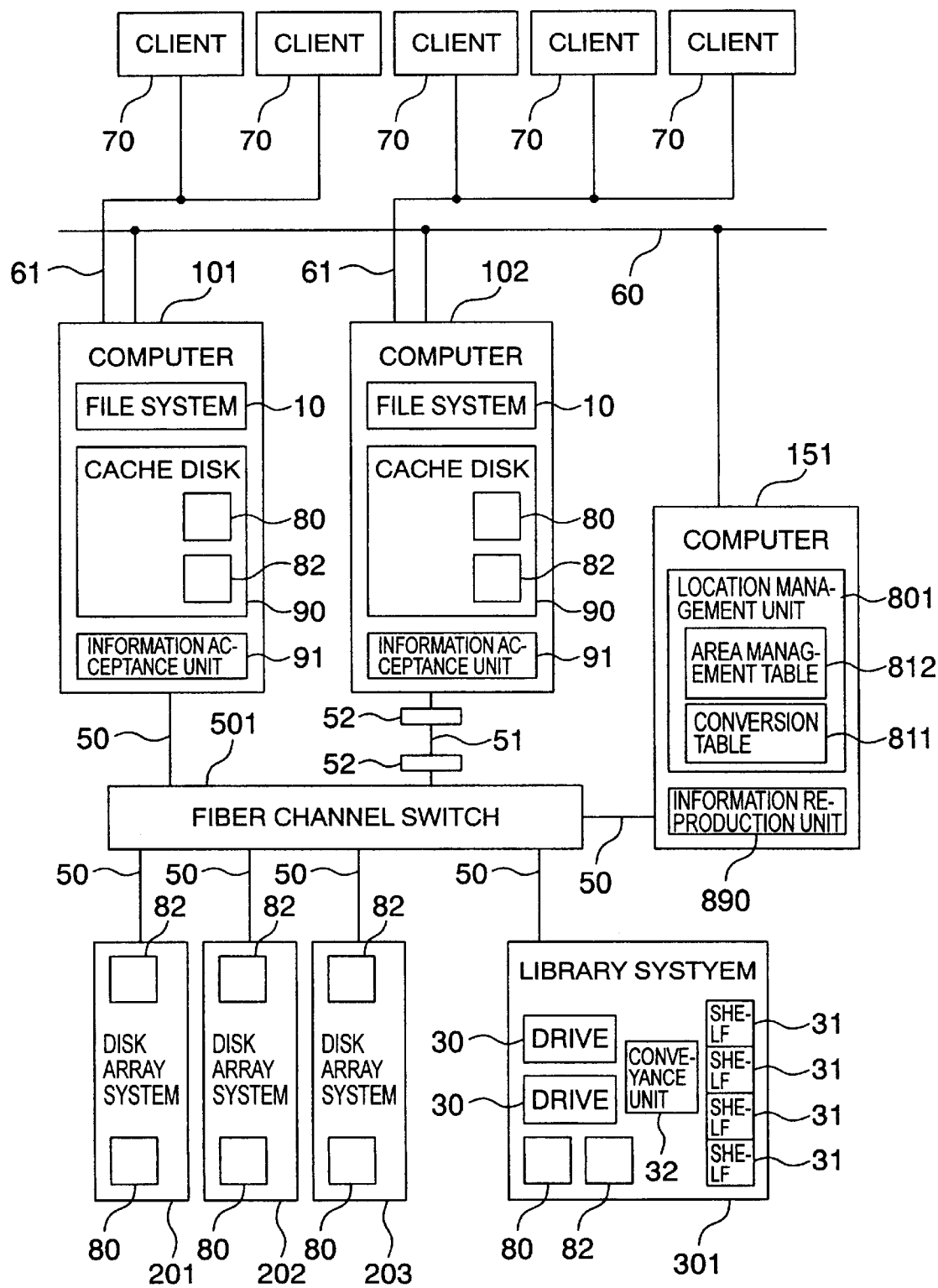
FIG. 1 is a block diagram showing a system according to an embodiment of the invention.

FIG. 1 shows a system configuration of the first embodiment. The present system includes three computers 101, 102, 151, three disk array systems 201, 202, 203, a library system 301, and a fibre channel switch 501. The computers 101, 102, 151, the disk array systems 201, 202, 203, and the library system 301 are connected to the fiber channel switch 501 through a fibre channel 50. The fibre channel switch 501 operates to set up a path between the components connected to the system or switch the path. The computers 101, 102, 151 are connected with one another through an Ethernet 60.

Later than the first embodiment, the second and the third embodiments will be described. The second and the third embodiments have the same configuration as the first embodiment. Hence, those embodiments will be described with reference to FIG. 1. In FIG. 1, the cache disk 90 and the data acceptance unit 91 located in the computers 101 and 102 and an operation ratio measurement unit 82 located in the computers 101, 102, the disk array systems 201, 202, 203, and the library system 301 are specific to the system of the second embodiment. Hence, the disk measurement unit 82 is not mentioned with respect to the first embodiment. Likewise, a client 70 is specific to the system of the third embodiment. Hence, it is not mentioned in the first and the second embodiments.

In FIG. 1, a network arranged with the fibre channel 50 is generally called SAN (Storage Area Network). A network arranged with the Ethernet 60 is generally called LAN (Local Area Network). In FIG. 1, these two networks, the fibre channel 50 and the Ethernet 60, are used for arranging the system. The other networks may be used in place of these networks. The function of the Ethernet 60 may be covered by the fibre channel 50.

Of the three computers, the computer 151 provides the location management unit 801 of the data and the data duplication unit 890, which will be discussed below in detail.

Next, the description will be oriented to the disk array system and the attribute preservation unit. In general, the disk array system includes a plurality of hard disks and is served as a storage device with improved performance and reliability through the effect of the RAID (Redundant Array of Inexpensive Disks). The performance and reliability of the disk array system substantially depends on the performance and the number of the hard disks composing the disk array system and the RAID level. For example, the level called RAID0 has a higher performance by distributing the data into a plurality of hard disks. However, if only one of the hard disks composing the RAID0 is failed, all the data may be lost. The level called RAID5 has a higher performance by distributing the data into a plurality of hard disks and provides a higher reliability that even if only one of the hard disks composing the RAID5 is failed, the data may be restored by adding redundant data composed of a parity. The RAID5 is more improved in reliability than the RAID0, while it is lower in performance when writing the data. Moreover, the performances of the RAID0 and RAID5 substantially depend on the number of the hard disks composing the RAID.

In this embodiment, the disk array systems 201 and 202 are composed by the RAID0 and the disk array system 203 is composed by the RAID5. Each disk array system provides the attribute preservation unit 80. The attribute preservation units 80 located in the disk array systems 201 and 202 serve to preserve the fact that the disk array system 201 and 202 are composed of the hard disks through the RAID0, the cost per one unit volume, the number of the hard disks composing the disk array system, and the performance of the hard disk (such as the number of revolutions, the seek time, and the throughput). The attribute preservation unit 80 located in the disk array system 203 serves to preserve the fact that the disk array system 203 is composed of the hard disks through the RAID5, the cost per one unit volume, the number of the hard disks composing the disk array system, and the performance of the hard disk (such as the number of revolutions, the seek time and the throughput). Hence, the location management unit 801 enables to easily grasp the performance and the reliability levels of the disk array system by picking up the attribute data from the attribute preservation unit 80. As an implementation of the attribute preservation unit 80, it is preferable to provide a nonvolatile storage located in the disk array system. For example, the attribute preservation unit 80 can be realized by the memory for storing a device identifier and device data. For picking up the data stored in the attribute preservation unit 80, it is possible to use an INQUIRY command or a MODE SENSE command defined by the SCSI (Small Computer System Interface).

Then, the description will be oriented to the library system and the attribute preservation unit. In this embodiment, the library system 301 includes two DVD-RAM drives 30, four shelves 31 that may store mediums, and one conveyance unit 32 for conveying a medium between the drive 30 and the shelf 31. However, the present invention does not rely on the number of the drives, the number of the shelves, the number of the conveyance units, and so forth located in the library system. Further, the present invention may be composed of two or more library systems. In this embodiment, each of the four shelves 31 may store one DVD-RAM medium. The library system 301 serves to convey the medium specified by the instruction given from the computer from one drive to another, from one drive to a shelf, and from one shelf to another through the effect of the conveyance unit 32.

In order to read the data recorded on the medium stored in the library system 301, at first, the computer operates to instruct the library system to convey the medium on which the data to be read is recorded from the shelf to the drive. Then, the computer waits for a report on termination of the conveyance from the library system 301 and then instructs the drive 30 to read the data thereout. As mentioned just above, it takes a conveyance time of the medium by the conveyance unit 32 plus the time passed until the target data is to be read (that is mainly a spin-up time passed until the medium reaches the readable number of revolutions) to read the target data out of the medium. Assuming that this time is about ten seconds, the difference of the reading time between the library system 301 and the disk array system 201, 202 or 203 is three digits or more because the time taken to read the target data by the disk array system 201, 202 or 203 is several milliseconds.

In this embodiment, the library system 301 provides the attribute preservation unit 80 as well. The attribute preservation unit 80 located in the library system 301 preserves the fact that the library system is composed of a DVD-RAM drive, the cost per a unit volume, the conveying time, the number and the type of the drives 30 mounted in the library system 301, the number, the types and the lives of the mediums, and the performance of the drive (such as the number of revolutions, the seek time, and the throughput). The attribute preservation unit 80 may be preferably realized by the nonvolatile storage located in the library system 301.

Next, the description will be oriented to the location management unit and the conversion table.

The computer 151 provides the location management unit 801. Concretely, the location management unit 801 is mounted as software to be executed in the computer 151. The location management unit 801 is served to communicate with the computer 101 or 102 through a LAN 60. The protocol used for the communication is not so much defined. For example, the TCP (Transmission Control Protocol) or the UDP (User Datagram Protocol) may be used. When the location management unit 801 accepts a file name from the computer 101 or 102, the unit 802 operates to lock the file data of the file data if necessary and then report the location of the target data to the computer 151. For this operation, the conversion table 811 is prepared in which the file names correspond with the location data of the data.

FIG. 2 shows the composition of the conversion table 811. The conversion table 811 is stored in the memory of the host computer 151. The conversion table 811 provides the fields of a write bit, a read count, control information, two or more location data units, and a file history for one file name. (The group ID will be discussed below.) Each location data includes an effective bit, a storage number, a medium number, a LBA (Logical Block Address), and a data length. In this embodiment, a WWN (World Wide Name) is used for the storage number. The WWN is a number allocated to a fibre channel adapter. In this embodiment, the WWN of the disk array system 201 is "201", the WWN of the disk array system 202 is "202", the WWN of the disk array system 203 is "203", and the WWN of the library system 301 is "301". The medium number is effective only if the target storage is the library system. It stores the number of the medium (or the number of the shelf) where the target data is stored. As the LBA is used a logical block address at which the data is stored. The logical block is a minimum unit for storing the data to be managed by the storage. For the disk array, in general, it may store data of 512 bytes. For the DVD-RAM medium, in general, it may store data of 2048 bytes. The logical block address means a number allocated to the logical block. The location data is effective only if the effective bits of the location data are set.

Figures 3, 4:
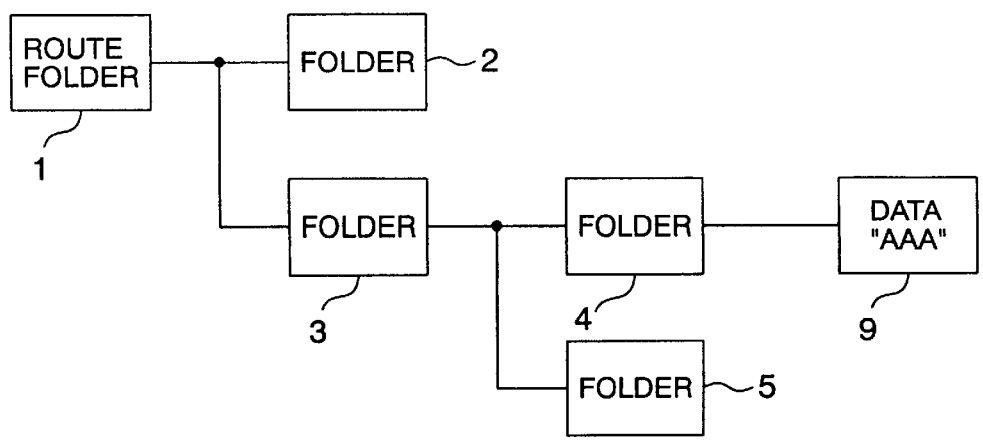
FIG. 3 is a table showing an area management table.
FIG. 4 is a diagram showing a directory configuration.

Next, the description will be oriented to the location management unit and an area management table. The location management unit 801 provides an area management table 812. FIG. 3 shows one example of the area management table 812. The area management table 812 is prepared for each disk array system in the case of the disk array system 201, 202 or 203 or for each medium in the case of the library system 301. The area management table 812 is a table that indicates which of the logical blocks is used in the system or the medium. In the table, one bit is allocated to one logical block. That is, if the bit corresponding to the logical block is "1", the data has been already located in the logical block. If it is "0", the logical block is not used. The area management table 812 is stored in the memory of the computer 151.

Figure 5:
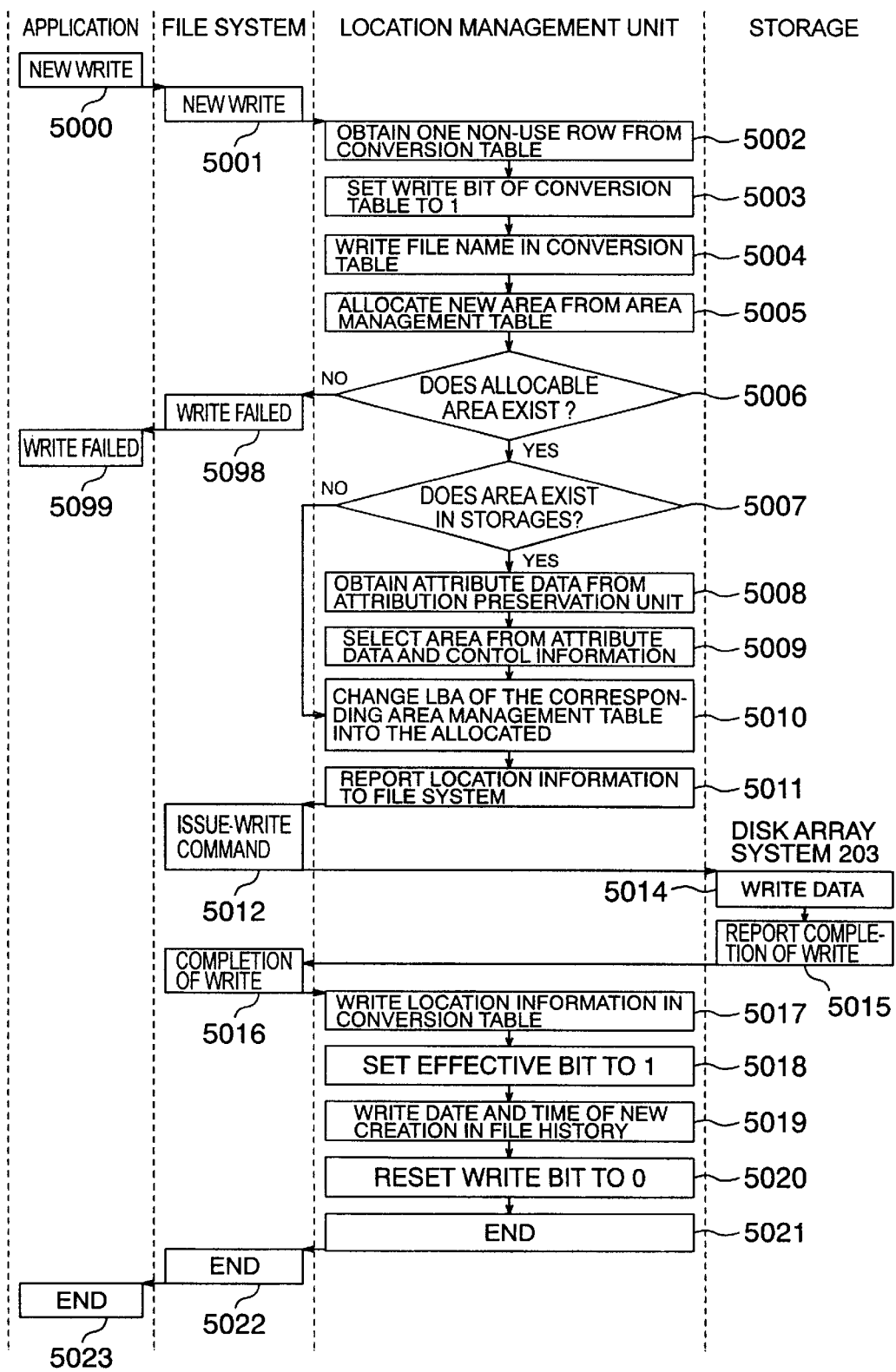
FIG. 5 is a flowchart showing a new writing process in the first embodiment of the invention.

Then, the description will be oriented to the new writing process. FIG. 5 is a flowchart showing a process of newly writing data in the storage. This process corresponds to the case that the user of the computer 101 newly creates a document with an application program like a wordprocessor and saves it at first (5000).

The file system 10 of the computer 101 requests the location management unit 801 of the computer 151 to allocate a new area to the data called the file name "AAA" through the Ethernet 60 (5001). At this time, the computer 101 adds as numeric values the data length of the data "AAA" (the data "AAA" means the entity data of the file of the file name "AAA") as well as the control information for indicating how the data "AAA" is stored. The control information includes "fast", "highly reliably", "at long term", "inexpensively", "for a disaster", "temporarily", "in parallel", and "portably", and so forth. They may be set at a time or exclusively. Herein, it is assumed that the "highly reliably" is specified.

The location management unit 801 operates to seek one empty line from the conversion table 811 (5002), set the write bit to "1" (5003), declare the start of the write, and then write the file name (5004). Herein, it is assumed that the first (#1) location data of the conversion table 811 is secured (5005). Herein, assuming that a sufficient empty area is secured in all the storages (5006, 5007), the location management unit 801 enables to obtain the allocable location from all the storages. The location management unit 801 enables to obtain the attribute data of the storage from the attribute preservation unit 80 of each storage (5008). The location management unit 801 operates to select the disk array system 203 composed of the RAID5 from the three disk array systems based on the control information "highly reliably" pointed by the computer 101 (5009), change the LBA of the corresponding area management table 812 into the allocated (5010), and report the location data to the computer 101 (5011).

In response to the report of an empty area, the file system 10 of the computer 101 operates to issue to the disk array 203 the write command for writing the data on a specified empty area (5012), and then to write the data on the empty area (5014). The issuance of the write command and the transfer of the data to be written are carried out through the fibre channel 50. When the file system 10 of the computer 101 accepts the report on the completion of the write from the disk array system 203 (5015), the file system 10 operates to report the completion of the write to the location management unit 801 of the computer 151 (5016).

In receipt of the report on completion of the write, the location management unit 801 operates to write the WWN, the LBA and the data length of the disk array system 203 in the corresponding location data of the conversion table 801, herein, the first location data (5017) and then to set the effective bit to "1" (5018). By this operation, it is indicated that the first location data is effective. In this case, since the data is written in the disk array system, it is not necessary to put the value into the medium number. Further, the new creation and the date thereof are written in the file history (5019). Lastly, the write bit is set to "0" (5020) and then the write is completed (5021). In receipt of the report on completion of the write from the location management unit 801, the file system 10 operates to report the completion of the write to the application (5022). By this report, the save of the new document from the application is completed (5023).

In the processing step 5006 of the flowchart shown in FIG. 5, if no allocable area is left, the writing process is failed (5098, 5099). Further, if in the processing step 5006 the allocable area is left but in the processing step 5007 no area is left in the plurality of storages, the operation goes to the processing step 5010.

Figure 6:
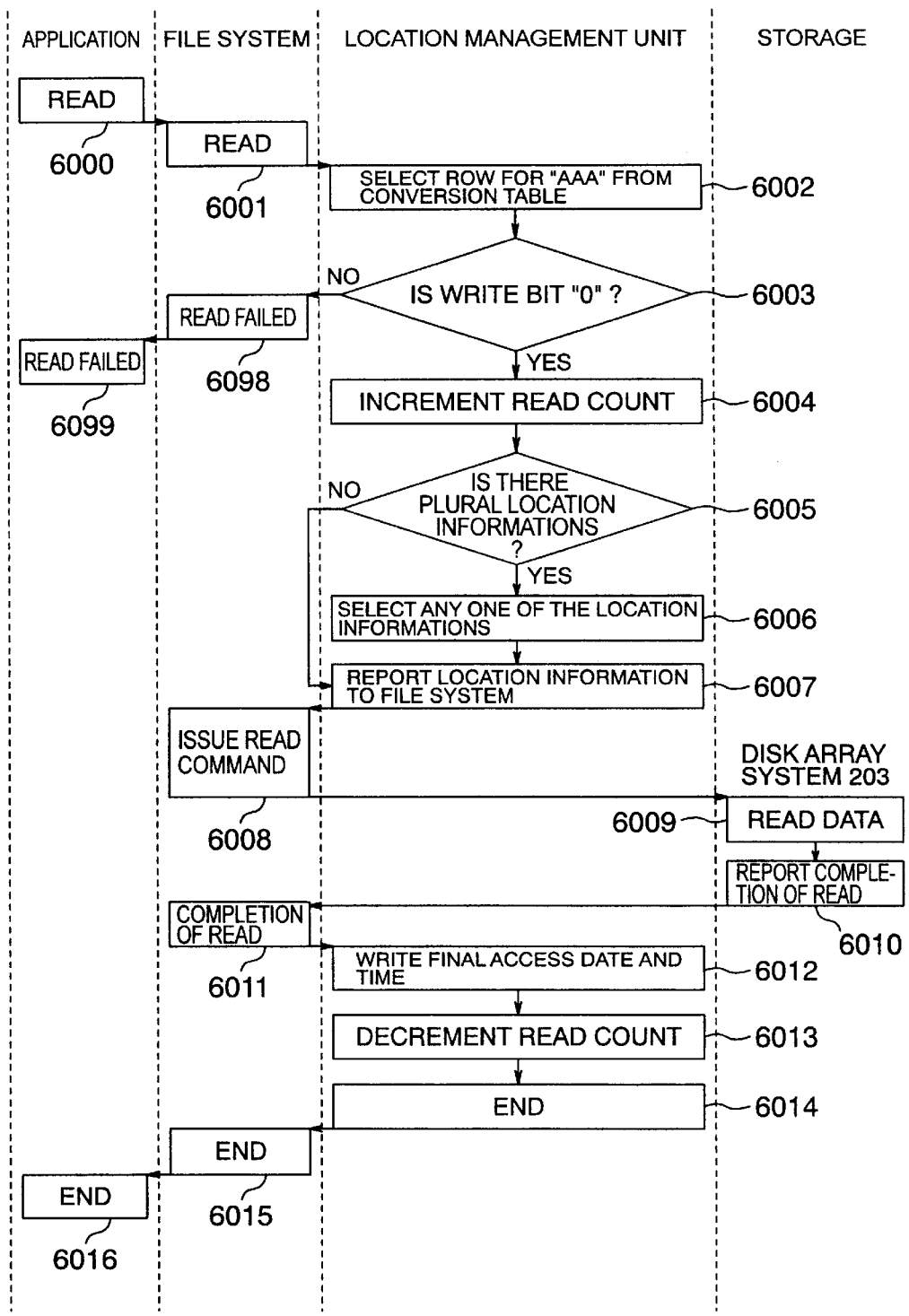
FIG. 6 is a flowchart showing a reading process in the first embodiment thereof.

Then, the description will be oriented to the reading process. FIG. 6 is a flowchart showing the process for reading data from the storage in the present system. This process corresponds to the fact that the user of the computer 101 reads the previously saved document through the application program like a wordprocessor (6000).

The file system 10 of the computer 101 requests the location management unit 801 to read the data of the file name "AAA" through the Ethernet 60 (6001). The location management unit 801 operates to select the row for the file name "AAA" from the conversion table 811 (6002) and then make sure that the write bit is "0" (6003). If the write bit is "1", it means that another application program (that may be an application program of another computer) is using the data "AAA". Hence, the data cannot be read out (6098, 6099).

Then, the read count is incremented (by 1) (6004) and then the location data having the data "AAA" is reported to the computer 101 (6007). If the location data contains only one data unit for "AAA", that location data has to be reported. If two or more location data units for "AAA" are contained, the most approximate location data to the computer 101 (for example, which portion of the data is the fastest reading spot) is selected (6006). Then, the selected location data unit is reported to the computer 101 (6007). Herein, it is the location data of the data "AAA" written in the foregoing new write.

In receipt of the report on the location information (WWN, LBA, data length), the file system 10 of the computer 101 operates to issue a read command to the disk array system 303 (6008) and then read the data from the disk array system 303 (6009). This issuance of the read command and the transfer of the read data are carried out through the fibre channel 50. When the file system 10 of the computer 101 receives the report on completion of reading the data from the disk array system 203 (6010), the file system 10 operates to report the completion of reading the data to the location management unit 801 of the computer 151 (6011).

In receipt of the report on completion of reading the data, the location management unit 801 operates to write the final access date and time in the file history (6012) and then decrement the read count by 1 (6013). If the read count is 0, it means that none refers to the data "AAA". Unless it is 0, it means that the data "AAA" is being read out. When the file system 10 accepts the report on completion of reading the data from the location management unit 801 (6014), the file system 10 operates to report the completion of reading the data to the application program (6015). This results in completing the operation of reading the document being executed by the application program (6016).

Then, the description will be oriented to the change of the control information. The user enables to refer to the set control information or reset it by using the utility prepared on the computer 101 or 102. Herein, the change of the control information of the pre-written data "AAA" is described as an example. When the user requests the utility to reset the control information, the file system 10 operates to request the location management unit 801 to read out the control information. The location management unit 801 operates to read the control information of the data "AAA" from the conversion table 811 and then report it to the file system 10. In receipt of the control information, the file system 10 operates to report the control information to the utility. Herein, it is assumed that the location management unit 801 reads the preset control information of "highly reliably".

Then, when the user changes the control information from "highly reliably" into "inexpensively", the file system 10 requests the location management unit 801 to write the control information. The location management unit 801 operates to change the control information for the data "AAA" of the conversion table 811 into "inexpensively" and then report the completion of the change to the file system 10. The file system 10 operates to report the completion of the change to the utility and then the change of the control information is terminated.

Figure 7:
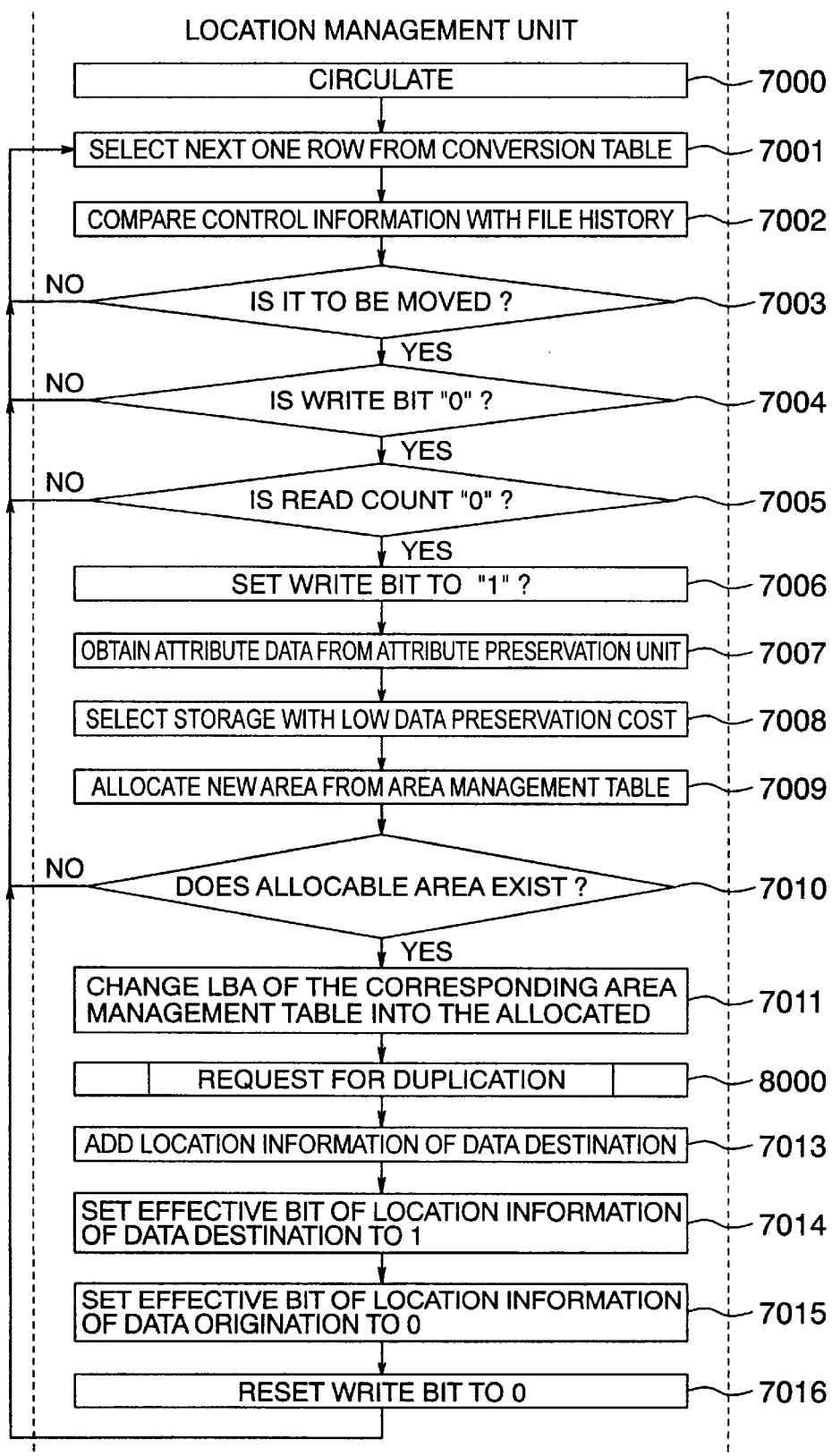
FIG. 7 is a flowchart showing a monitoring and moving process performed by the location management unit in the first embodiment thereof.
Figure 8:
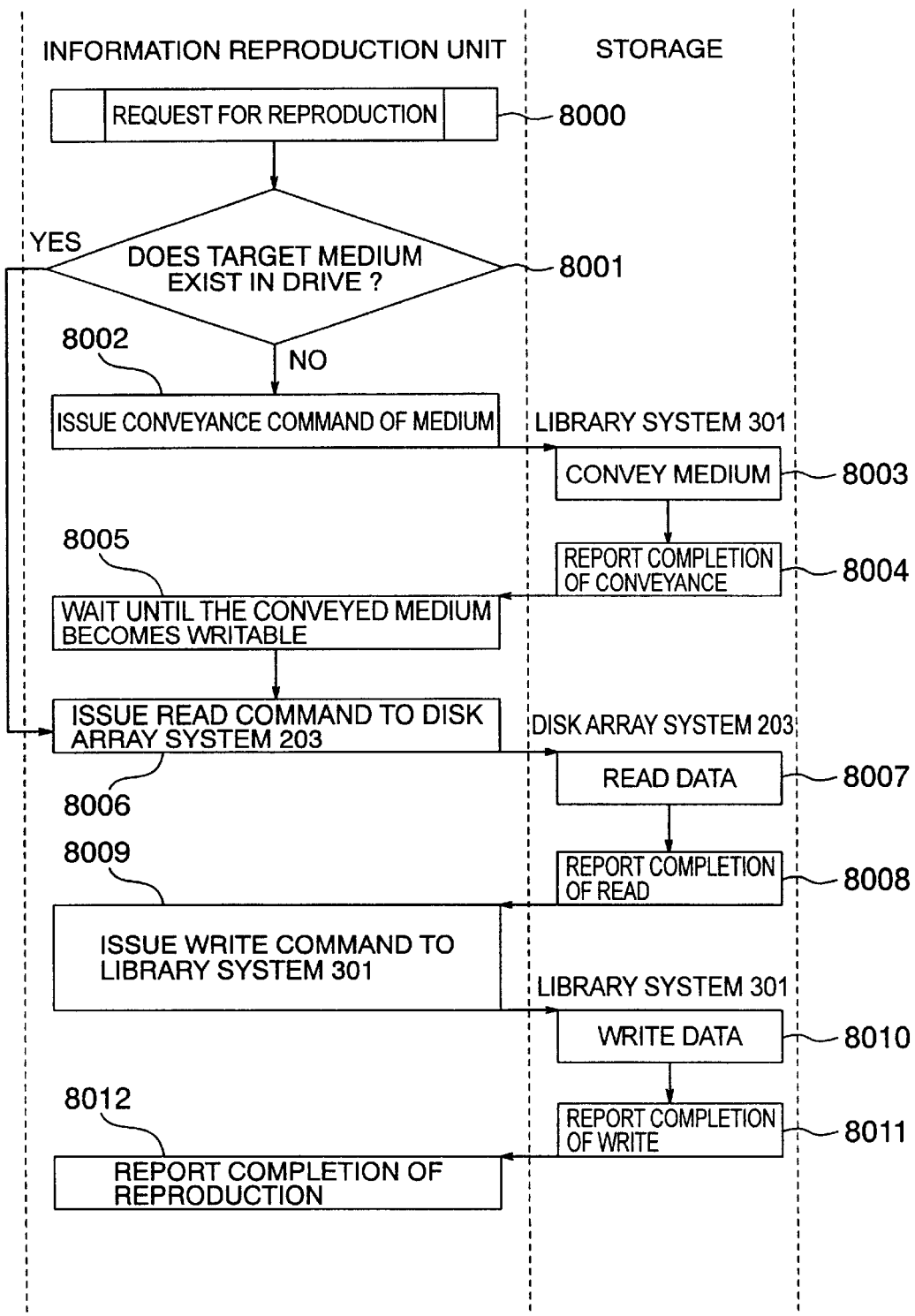
FIG. 8 is a flowchart showing a duplicating process.

In turn, the description will be oriented to the monitoring and the movement executed by the location management unit 801. FIGS. 7 and 8 are flowcharts showing the process of monitoring and moving the data to be executed by the location management unit 801. Herein, the movement of the data "AAA" from the disk array system 203 to the library system 301 will be described as an example. The location management unit 801 iteratively retrieves the conversion table 811 at a certain period (7000). As to the data "AAA" whose control information is changed from "highly reliably" into "inexpensively", the change is found at this periodical cycle (7001). The location management unit 801 operates to compare the final access date and time of this data with the current date and time (7002) for the purpose of checking if a certain period of time (for example, 90 days) is passed (7003). If a certain time of length is passed, the target data "AAA" is moved into the storage with a lower bit cost. In this embodiment, assuming that the preservation cost of the disk array system 201 or 202 is "10", the preservation cost of the disk array system 203 is "15", and the preservation cost of the library system 301 is "1", the location management unit 801 operates to reduce the preservation cost of the data by moving the data "AAA" to the library system 301.

Then, the location management unit 801 operates to make sure that the write bit is "0" (7004) and the read count is "0" in the conversion table 811 (7005), set the write bit to "1" (7006), refer to the area management table 812, and then retrieve a required area for storing the data "AAA" from the medium of the library system 301. In this embodiment, the process is executed to obtain the attribute data of the attribute preservation unit 80 (7007), select the storage with a lower data preservation cost based on the attribute data (7008), and allocate a new area to the selected storage (7009).

If an empty area where the data "AAA" is to be stored is found (7010), the location management unit 801 operates to change the LBA of the corresponding area management table 812 into the allocated (7011) and then request the information duplication unit 890 to duplicate the data "AAA" (8000). In this embodiment, the information duplication unit 890 is provided in the computer 151. In place, it may be located in the fibre channel switch 501 or another instrument to be connected with the fibre channel switch 501.

FIG. 8 shows the duplicating process to be executed by the information duplication unit 890. The duplication unit 890 operates to issue to the library system 301 a conveyance instruction for conveying a medium with an empty area found therein to the drive 30 (8002). If the target medium is located in the drive, it is not necessary to convey the medium (8001). The conveyance unit 32 operates to convey the specified medium form the shelf where it is stored into the specified target drive (8003, 8004). Then, the information duplication unit 890 operates to issue the read command to the disk array system 203 where the data "AAA" has been already written (8006), read the data from the disk array system (8007, 8008), issue the write command to the drive to which the conveyed medium is mounted (8009), and write the data in the medium (8010, 8011). Upon completion of the write command, the information duplication unit 890 operates to report the completion of duplication to the location management unit 801 (8012).

Returning to FIG. 7, in receipt of the report on completion of the duplication, the location management unit 801 operates to write the WWN of the library system 301, the medium number, the LBA, and the data length in an empty row of the conversion table 81, herein, the second location information thereof (7013) and then set the effective bit to "1" (7014). Then, the location management unit 801 operates to nullify the first location information by setting the effective bit of the first location information to "0" and then put into nonuse the LBA of the area management table 812 corresponding to the first location information. Lastly, the location management unit 801 operates to write the date and time of the movement in the file history and to set the write bit to "0", and the movement is completed (7016).

After the data "AAA" is moved, for example, if the computer 102 requests to read the data "AAA", the location management unit enables to correctly report the location of the data "AAA" stored in the library 301. This is because the location management unit 801 manages the location information of the conversion table 811 in a unified way. It is not necessary to report the movement of the data from the disk array system 203 to the library system 301 to the computers 101 and 102.

If the data "AAA" includes the control information "highly reliably" in addition to "inexpensively", the location management unit 801 retrieves two mediums for an empty area and then moves the data to the mediums. As a result, if one medium is failed so that no data can be read or if one medium is lost, the data can be read, so that the control can be executed "highly reliably".

Figure 15:
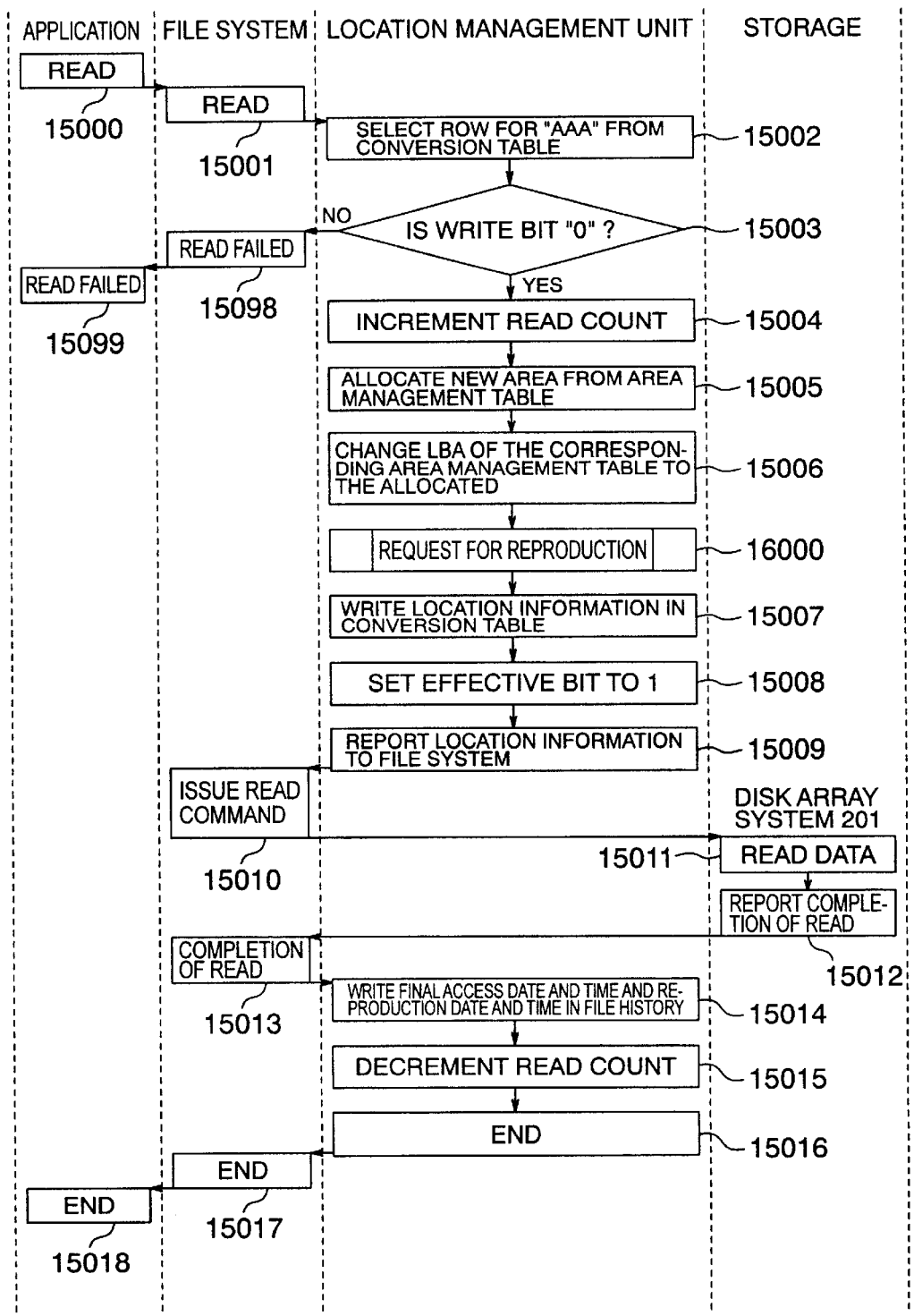
FIG. 15 is a flowchart showing a process of reading data stored in the library system in the first embodiment.
Figure 16:
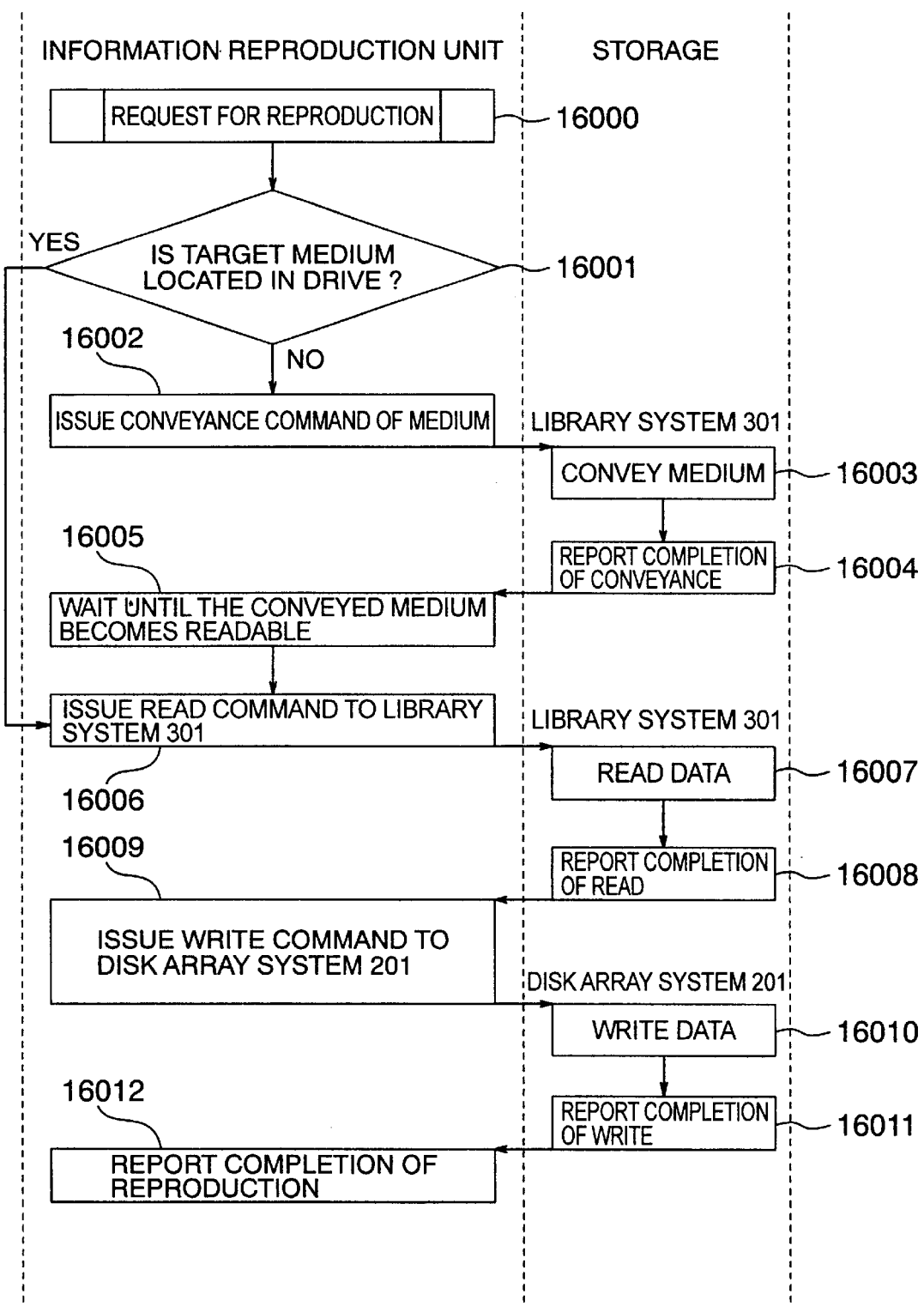
FIG. 16 is a flowchart showing a duplicating process.

Then, the description will be oriented to the reference to the data stored in the library system 301. FIGS. 15 and 16 are flowcharts showing a process of reading the data "AAA" stored in the library system 301. For example, it is assumed that after the data "AAA" is moved from the disk array system 203 into the library system 301, the computer 102 requests to read the data "AAA" (15000). The file system 10 of the computer 102 requests the local management unit 801 to read the data with the file name "AAA" through the Ethernet 60 (15001).

The location management unit 801 selects the row corresponding to the file name "AAA" from the conversion table 811 (15002), makes sure that the write bit is "0" (15003), increments the read count, and then starts the reading process (15004). The local management unit 801 operates to retrieve the disk array system 201 for an empty area where the data "AAA" is to be stored (15005). If an empty area is found, the local management unit 801 operates to change the corresponding LBA of the area management 812 into the allocated (15006) and requests the information duplication unit 890 to duplicate the data "AAA" from the library system 301 to the disk array system 201 (16000).

FIG. 16 shows the duplicating process executed by the information duplication unit 890. The information duplication unit 890 operates to instruct the library system 301 to convey the medium where the data "AAA" is stored into the drive 30 (16002). If the medium where the data "AAA" is stored has been already mounted into the drive, it is not necessary to convey the medium (16001). The conveyance unit 32 operates to convey the medium from the shelf where the specified medium is stored into the specified target drive (16003, 16004). Then, the duplication unit 890 waists until the medium having been conveyed to the drive is made readable (16005), issues the read command to the library system 301, reads the data from the system 301 (16007, 16008), issues the write command to the disk array system 201 (16009), and writes the data in the disk array system 201 (16010, 16011). Upon completion of the write command, the duplication unit 890 operates to report the completion of the duplication to the location management unit 801 (16012).

Returning to FIG. 15, in receipt of the report on completion of the duplication, the location management unit 801 operates to write the WWN, the LBA and the data length of the disk array system 201 in an empty location information row of the conversion table 811 ((15007), set the effective bit to "1" (15008), and then report this location information into the file system 10 of the computer 102 (15009).

In receipt of the location information (WWN, medium number, LBA, and data length), the file system 10 of the computer 102 operates to issue the read command to disk array system 201 (15010) and read the data from the system 201 (15011, 15012). When the file system 10 of the computer 102 accepts the report on completion of reading the data from the disk array system 201, the file system 10 operates to report the completion of reading the data to the location management unit 801 of the computer 151 (15013). In receipt of the report on completion of reading the data, the location management unit 801 operates to write the final access date and time and the duplicating date and time in the file history of the conversion table 811 (15014), decrement the read count (15015), and then complete the reading operation (15016, 15017, 15018).

In this case, even if the control information of "highly reliably" is assigned to the data "AAA", the file "AAA" is not required to be duplicated into the disk array 203 composed of the RAID5. This is because the data is held in two spots of the library system 301 and the disk array system 201 of the RAID0.

Herein, if the location management unit 801 makes sure that the duplicated data on the disk array system 201 is not accessed for a given length of time, the management unit 801 operates to reset the effective bit of the location information to "0". In this case, the LBA of the area management table 812 corresponding to this location information is returned into the nonuse mode.

Next, the description will be oriented to the variation of the control information. The two control informations "inexpensively" and "highly reliably" have been theretofore described. In the following, the description will be oriented to the operation in the case that another control information is set.

If the control information of "fast" is given, the data is recorded in two spots, that is, the RAID0 disk array systems 201 and 202. Since the RAID0 is inferior in reliability to the RAID5, the reliability can be maintained by recording the data in the two RAID0 disk array systems. If the control information of "temporarily" is added together with the control information of "fast", the data is recorded on just one RAID0 disk array system.

If the control information of "at long term" is given, the data is recorded in a removable optical recording medium such as a DVD-RAM medium. It is reported that the DVD-RAM medium may be stored for thirty years. The DVD-RAM medium lends itself to saving the data for a longer time than the hard disk. If the control information of "highly reliably" is given in addition to the control information of "at long term", the data is recorded on two mediums. Further, if the control information of "fast" is given in addition to the control information of "at long term", the data is recorded in the disk array system. The data recorded in the disk array system is served as a cache for the library system with a slow access speed.

If the control information of "for a disaster" is given, the data is duplicated in the recording device installed in a remote place. In this case, the attribute data holds the installing place of the storage, and the location management unit 801 records the data in two recording devices installed in different places. For example, assuming that the installing place of the disk array system 201 is "Tokyo", the installing place of the disk array system 202 is "Yokohama", and the installing place of the disk array system 203 is "Osaka", the location management unit 801 grasps the geographical relation of the installing places and records the data in two places, that is, the disk array system 201 located in "Tokyo" and the disk array system 203 located in "Osaka". When a disaster like an earthquake takes place, the fact that the distance between Tokyo and Yokohama is not for a disaster is pre-set in the location management unit 801.

The connecting distance of the fibre channel 50 is 10 km at maximum. In order to connect Tokyo and Yokohama with Osaka, it is necessary to convert the fibre channel 50 into another network like the ATM (Asynchronous Transfer Mode) 51.

If the control information of "in parallel" is given, the data is recorded in two places, that is, the disk array systems 201 and 202. The data recorded in the disk array system 201 is dedicated to the computer 101, and the data recorded in the disk array system 202 is dedicated to the computer 102. The location management unit 801 operates to determine which of the computers having requested to read the data and report the corresponding location information.

If the control information of "portably" is given, the data is recorded in the library system 301 from which the medium may be removed. At a time, the group ID (see FIG. 2) is added to the control information and then the result information is supplied to the location management unit 801. By this operation, the location management unit 801 operates to record the data so that the data sets having the same group ID may be gathered on one medium. For treating the control information of "portably", it is necessary to secure the area for holding the group ID in the conversion table 811.

Further, the aforementioned embodiments have been requested to give the control information when the data is newly written. Of course, the control information may be changed on the way through the utility. In the following, another way of giving the control information will be described.

FIG. 4 shows an example of a directory structure. The computer system often utilizes the directory structure for file management. This is because grouping the files in folders makes it easier for the user to retrieve the file. For example, in the configuration shown in FIG. 4, a route folder 1 as a start point has two subfolders 2 and 3. The subfolder 3 has two subfolders 4 and 5. Assuming that the data "AAA" is saved in this folder 4, the data "AAA" is "1/3/4/AAA". This type of directory is configured so that the basic control information is pre-set to the folder and the control information is succeeded to the files and the subfolders saved in the folder. For example, if "no control information" is given to the folder 1, "fast" is given to the folder 2, and "highly reliably" is given to the folder 3, these control informations are succeeded to the files stored in these folders, respectively. Further, if the folders 4 and 5 are created in the folder 3, the control information of "highly reliably" of the folder 3 is automatically given to the folders 4 and 5. In place, the new control information may be given to the folders 4 and 5 without succeeding the control information of the folder 3. If the control information of "at long term" is added to the folder 4, it means that the data "AAA" held in the folder 4 holds "highly reliably" and "at long term" as the default control information.

Further, by changing the control information of the folder 3, it is possible to change all the control informations of the folders and the files following the folder 3 at a batch. When the data "AAA" is moved from the folder 4 to the folder 2, it is possible to maintain the control information held in the data "AAA" as well as give the folder 2 the new control information. In this embodiment, all the settings on the succession of the control information may be set to the local management unit 801.

According to the system of the foregoing embodiment, the local management unit operates to select the proper storage among the storages shared by a plurality of computers through the use of the attribute data held in the attribute preservation unit and the control information set to the data and then to hold the data in the selected storage. Since the location management unit holds a plurality of location informations for recording the data, the location management unit enables to record the data in a plurality of storages and record the data according to the various control informations set by the user. All the locations of the data are uniquely managed by the location management unit. Hence, each time the data is moved and copied, the location management unit is not required to report the process to the plurality of computers.

In turn, the description will be oriented to the second embodiment of the invention (with a cache).

FIG. 1 shows a system configuration of the second embodiment. The difference of the second embodiment from the first embodiment is the respects of providing the cache disk 90 and the information acceptance unit 91 in the computer 101 and 102 and providing the operation ratio measurement unit 82 in the computers 101, 102, the disk array systems 201, 202, 203, and the library system 301. The cache disk 90 provided in the computer 101 and 102 is arranged to be recognized as a hard disk having one WWN by the file system 10 and the fibre channel switch 501.

Then, the operation ratio measurement unit 82 will be described below. The operation ratio measurement unit 82 located in the computer operates to measure the processing performance of the cache disk 90. The operation ratio measurement unit 82 located in the disk array systems 201, 202 and 203 operates to measure the processing performance of each disk array system. The processing performance in this embodiment means an average processing time needed for reading or writing the data. If the average processing time is made longer in a certain storage, it indicates that the accesses are focused on the storage. The operation ratio measurement unit 82 located in the library system 301 operates to measure the access frequency for each medium.

Next, the location management unit 801 will be described below. Like the first embodiment, the location management unit 801 of the second embodiment uses the conversion table 811 shown in FIG. 2 as well. The area management table 812 manages the disk array systems 201, 202, 203 and the medium mounted in the library system 301 as well as the empty areas of the cache disks 90 located in the computers 101 and 102.

Figure 9:
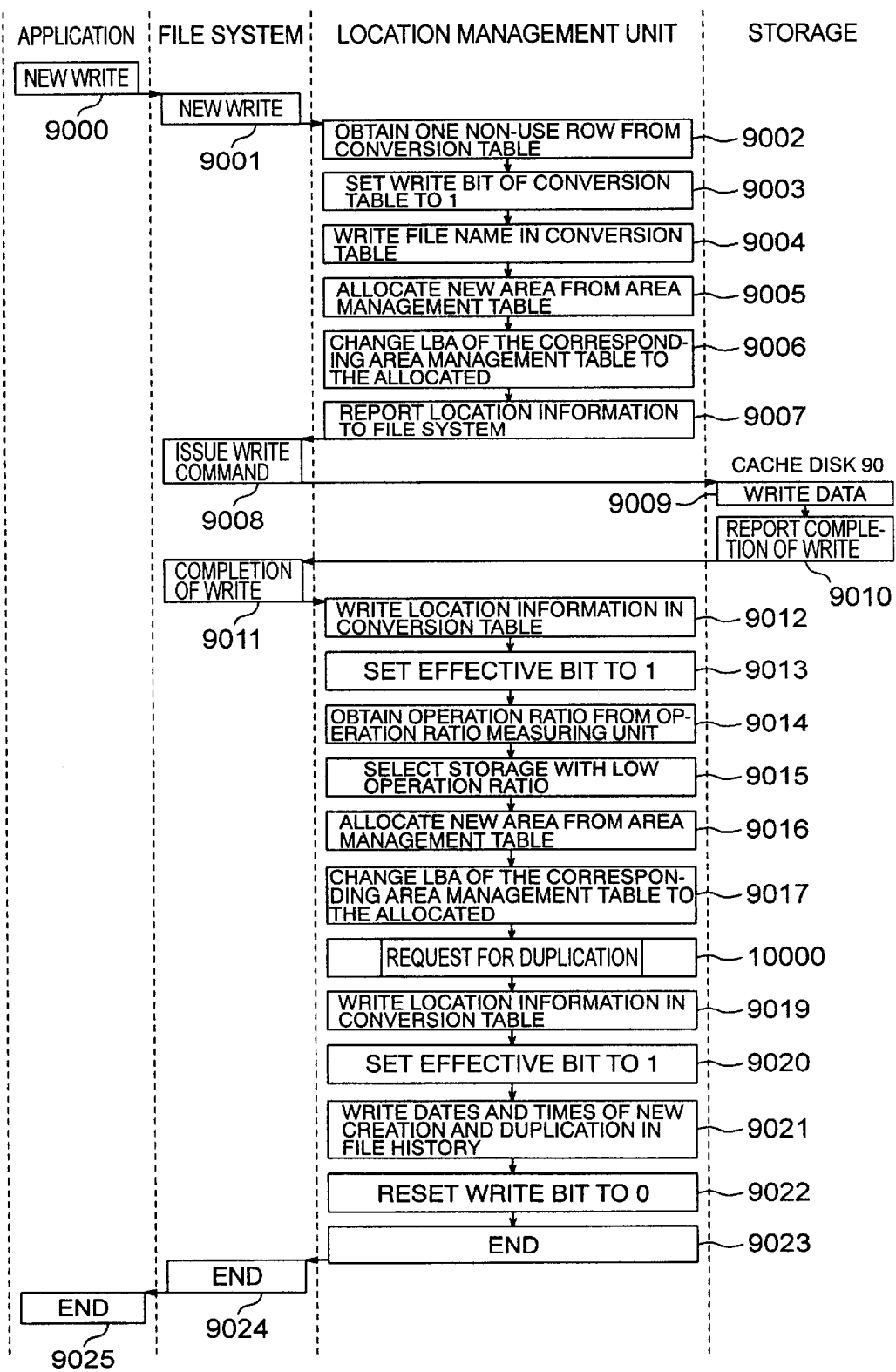
FIG. 9 is a flowchart showing a new writing process in the second embodiment.
Figure 10:
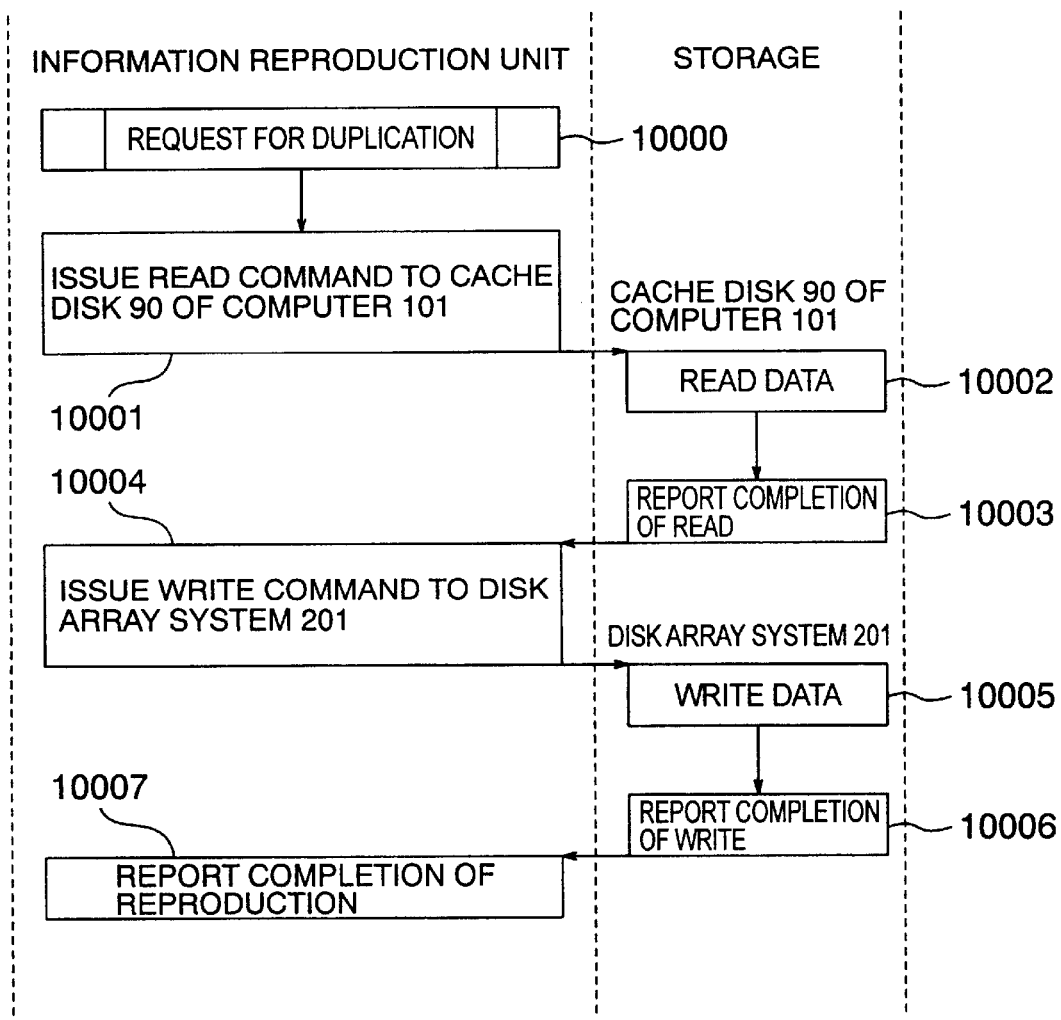
FIG. 10 is a flowchart showing a duplicating process.

Then, the new writing process will be described below. FIGS. 9 and 10 are flowcharts showing the process of newly writing the data in the storage. The file system 10 of the computer 101 operates to request the location management unit 801 of the computer 151 to allocate a new area to the data with the file name "AAA" (9001). The location management unit 801 operates to seek one empty row of the conversion table 811 (9002), declare the start of the write by setting the write bit to "1" (9003), and then write the file name (9004). Herein, it is assumed that the first location information of the conversion table 811 is written. The cache disk 90 of the computer 101 retrieves the area required for storing the data "AAA" by using the area management table 812 (9005). Herein, assuming that an empty area is sufficiently secured, the allocable location can be obtained. The location management unit 801 operates to change the LBA of the corresponding area management table 812 into the allocated (9006) and then report the location information to the computer 101 (9007).

In receipt of the report on the empty area, the file system 10 of the computer 101 operates to issue the write command for writing the data in the specified empty area to the cache disk 90 of the computer 101 (9008). This write is processed within the same computer, so that it is quite fast (9009). When the file system 10 accepts the report on completion of the write from the cache disk 90 (9010), the file system 10 reports the completion of the write to the location management unit 801 (9011). In receipt of the report on completion of the write, the location management unit 801 operates to write the WWN, LBA and the data length of the cache disk 90 of the computer 101 in the first location information of the conversion table 811 (9012), and set the effective bit to "1" (9013).

Then, the location management unit 801 operates to obtain the operation ratios from the cache disk 90 on the computer except the computer 101 and the operation ratio measurement unit 82 located in the disk array systems 201, 202 and 203 (9014), select the storage with the lowest operation ratio (9015), and then retrieve an empty area. Herein, assuming that the disk array system 201 has the lowest operation ratio, the disk array system 201 is retrieved for the area required for saving the data "AAA". If the empty area for saving the data "AAA" is found (9016), the location management unit 801 operates to change the LBA of the corresponding area management table 812 into the allocated (9017) and request the information duplication unit 890 to duplicate the data "AAA" (10000).

FIG. 10 shows the duplicating process performed by the information duplication unit 890. The information duplication unit 890 operates to issue the read command to the cache disk 90 of the computer 101 where the data "AAA" has been already written through the information acceptance unit 91 (10001), read the data "AAA" (10002, 10003), issue the write command to the disk array system 201 (10004), and write the data in the system 201 (10005, 10006). Upon completion of the write command, the information duplication unit 890 reports the completion of the duplication to the location management unit 801 (10007).

Returning to FIG. 9, in receipt of the report on completion of the duplication, the location management unit 801 operates to write the information of the WWN, the LBA and the data length of the disk array system 201 in an empty row of the conversion table 811, herein, the second location information (9019), and then set the effective bit to "1" (9020). Then, the new creation and its date and time and the duplicating date and time are written in the file system (9021). Lastly, by setting the write bit to "0" (9022), the write is completed (9023, 9024, 9025).

Figure 11:
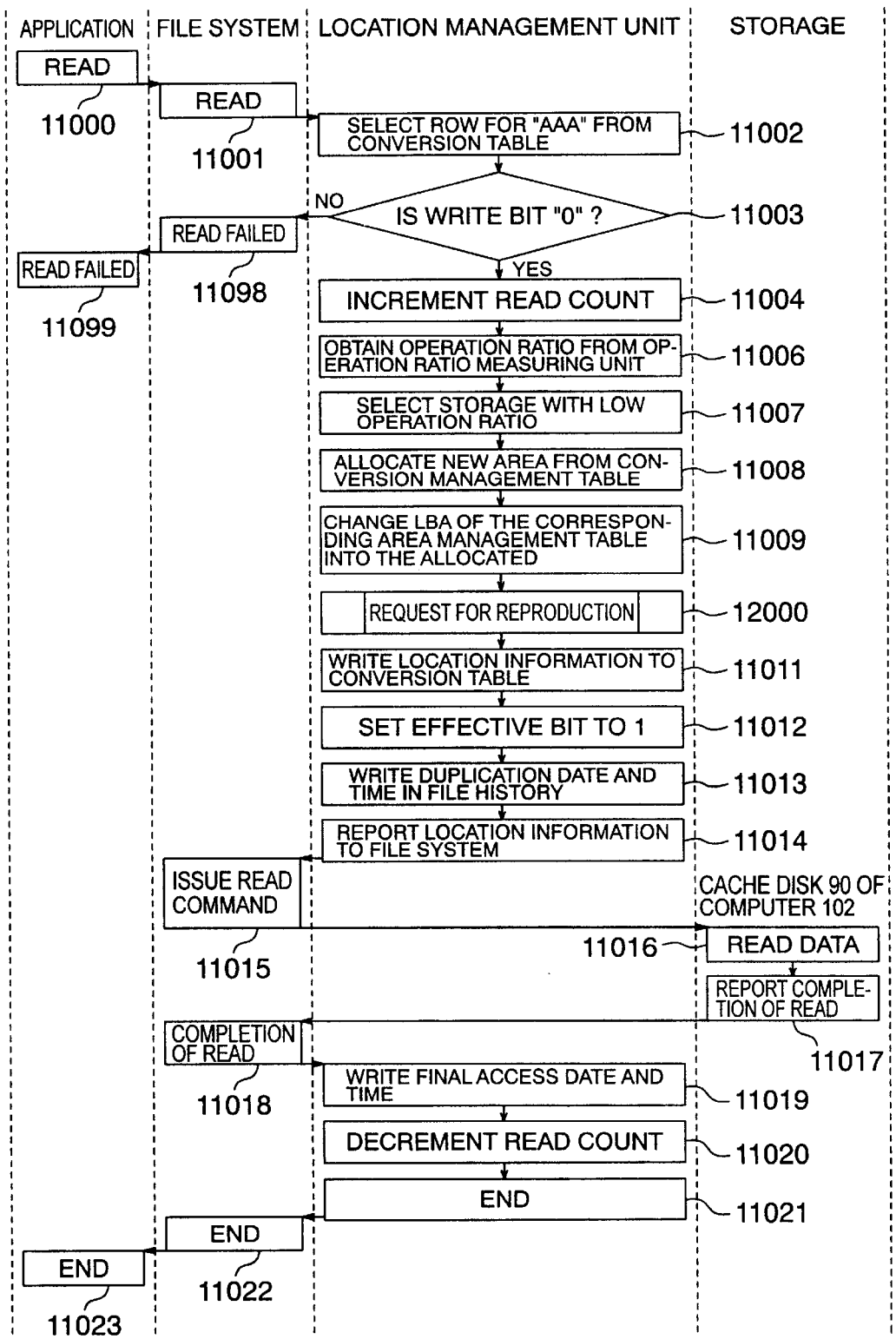
FIG. 11 is a flowchart showing a reading process in the second embodiment.
Figure 12:
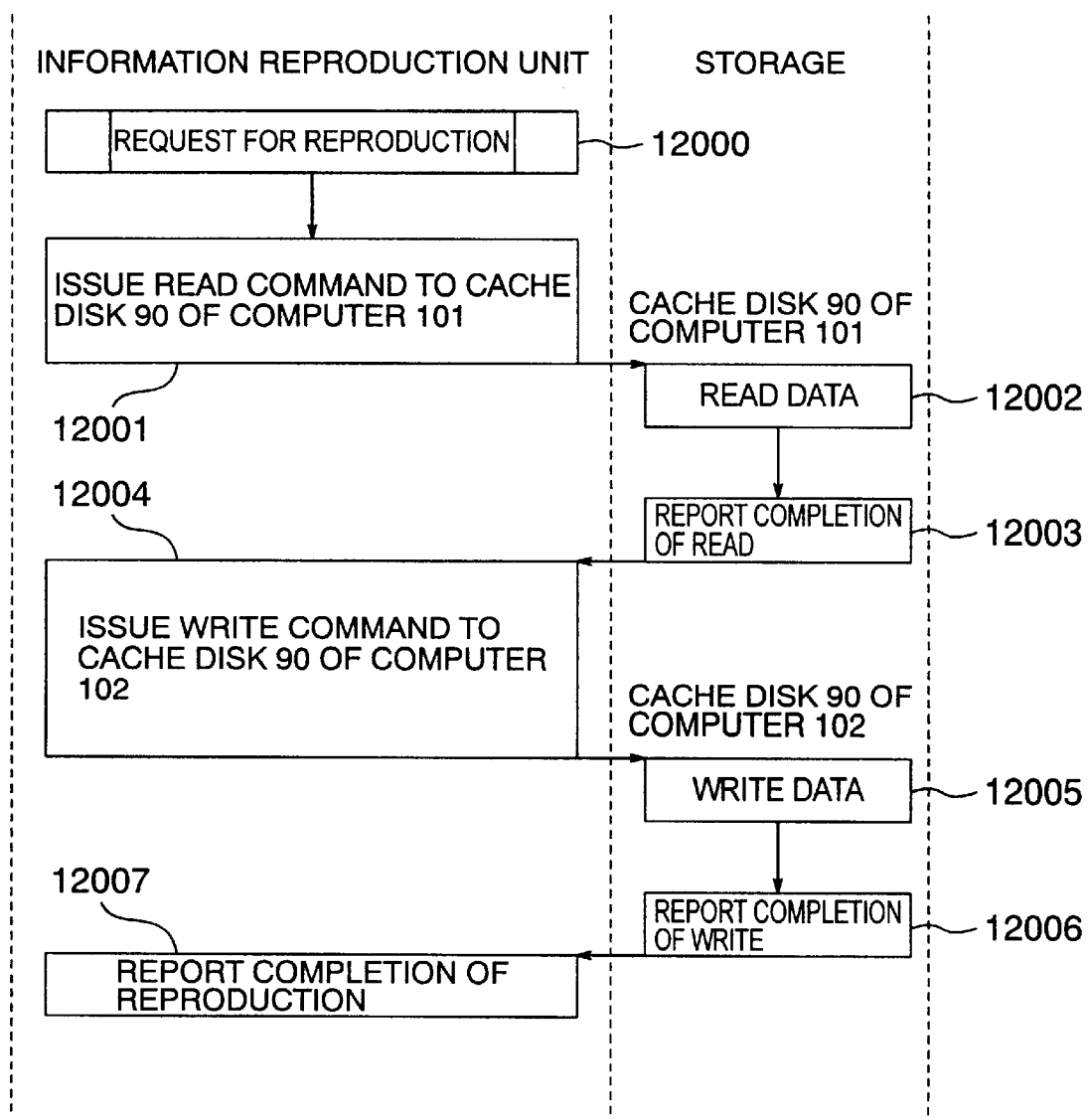
FIG. 12 is a flowchart showing a duplicating process.

Then, the reading process will be described below. FIGS. 11 and 12 are flowcharts for illustrating the process of reading data from the storage. In the foregoing writing process, the data "AAA" is located on the cache disk 90 of the host computer 101 and the disk array system 201. Herein, if the host computer 102 reads out the data "AAA" (11000), the file system 10 of the host computer 102 requests the location management unit 801 to read the data with the file name "AAA" through the Ethernet 60 (11001). The location management unit 801 operates to select the corresponding row to the file name "AAA" from the conversion table 811 (11002), make sure that the write bit does not rise (11003), and increment the read count (11004).

Next, the location management unit 801 operates to obtain the operation ratios from the cache disk 90 of the host computer and the operation ratio measurement unit 82 of the disk array system 201 where the data "AAA" is stored (1006) and then select the storage with the lowest operation ratio (11007). Herein, it is assumed that the cache disk 90 of the computer 101 has the lowest operation ratio. The location management unit 801 operates to retrieve the area management table 812 for the area required for storing the data "AAA" from the cache disk 90 of the computer 102 (11008). Herein, it is assumed that the empty area can be sufficiently secured. It means that the allocable location can be obtained. The location management unit 801 operates to change the LBA of the corresponding area management table 812 into the allocated (11009) and request the information duplication unit 890 to copy the data "AAA" from the cache disk 90 of the computer 101 to the cache disk 90 of the computer 102 (12000).

FIG. 12 shows the duplicating process to be executed by the information duplicating unit 890. The information duplication unit 890 operates to issue the read command to the cache disk 90 of the computer 101 where the data "AAA" has been already written (12001), read the data from the cache disk 90 (12002, 12003), issue the write command to the cache disk 90 of the computer 102 (12004), and write the data in the cache disk (12005, 12006). Upon completion of the write command, the information duplication unit 890 operates to report the completion of the duplication to the location management unit 801 (12007).

Returning to FIG. 11, in receipt of the completion of the duplication from the information duplication unit 890, the location management unit 801 operates to write the WWN, the LBA, and the data length of the cache disk 90 of the host computer 102 in the empty row of the conversion table 811, herein, the third location information (11011) and set the effective bit to "1" (11012). The location management unit 801 operates to write the duplicating date and time in the file history (11013). The location information of the cache disk 90 of the host computer 102 where the data "AAA" is entered is reported to the computer 102 (11014).

In receipt of the report on the location information (WWN, LBA, data length), the file system 10 of the computer 102 operates to issue the read command to the cache disk 90 of the computer 102 (11015) and then read the data from the cache disk 90 (11016). When the file system 10 accepts the report on completion of reading the data from the cache disk 90 (11017), the file system 10 operates to report the completion of reading the data to the location management unit 801 of the computer 151 (11018). When the location management unit 801 accepts the report on the completion of reading the data, the location management unit 801 operates to write the final access date and time in the file history (11019), and decrement the read count (11020), and then completes the reading operation (11021, 11022, 11023).

Figure 13:
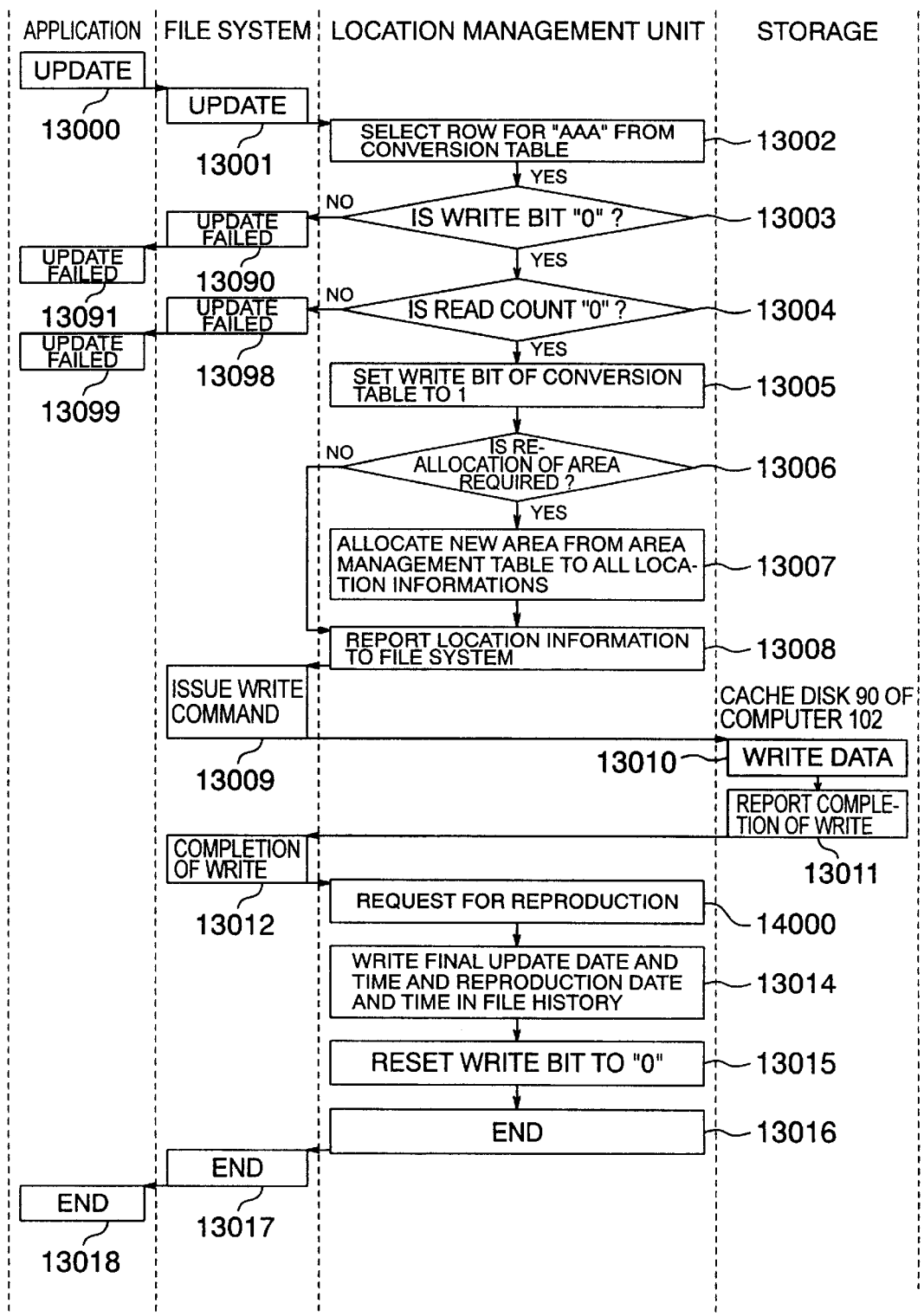
FIG. 13 is a flowchart showing a process of updating data in the second embodiment.
Figure 14:
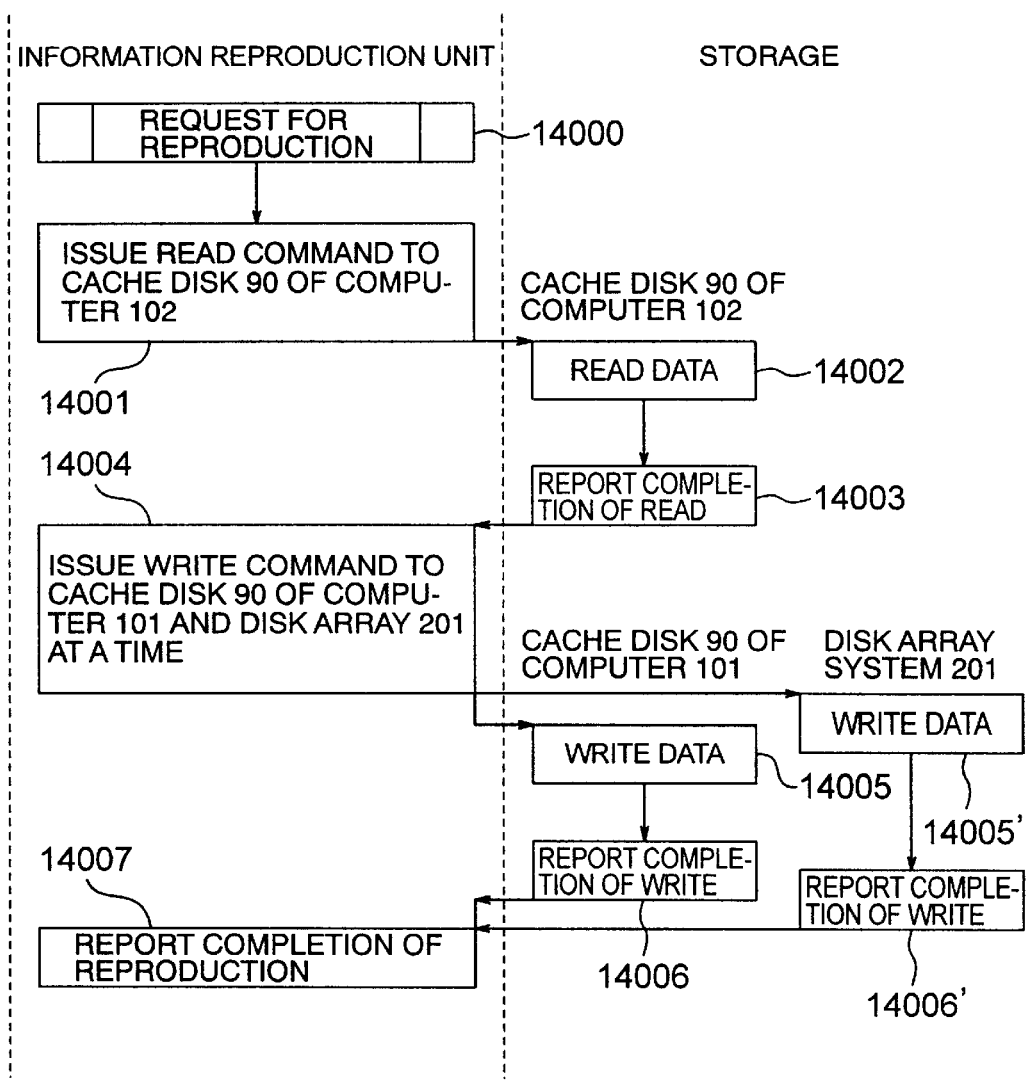
FIG. 14 is a flowchart showing a duplicating process.

Then, the description will be oriented to the process of updating the data. FIGS. 13 and 14 show the flowcharts for illustrating the process of overwriting the data for update. In the foregoing writing and reading processes, the data "AAA" is resident in three places, that is, the cache disks 90 of the host computers 101 and 102 and the disk array system 201. Herein, if the host computer 102 updates the data "AAA" (13000), the file system 10 of the host computer 102 operates to request the location management unit 801 to update the data with the file name "AAA" (13001) through the Ethernet 60 (13001). The location management unit 801 operates to select the corresponding row to the file name "AAA" from the conversion table 811 (13002) and then make sure that the write bit is "0" and the read count is "0" (13003, 13004). Unless the write bit is "0" or the read count is "0", it means that the update is failed (13090, 13091, 13098, 13099).

Next, the location management unit 801 declares the start of the update by setting the write bit to "1" (13005). If the data "AAA" has a longer data length, it is necessary to retrieve an empty area using the area management table 812 again (13006, 13007). Herein, the data length is constant. The location management unit 801 operates to report to the file system 10 of the computer 102 the third location information (that indicates the data "AAA" located in the cache disk 90 of the computer 102) (13008).

In receipt of the report on the location information, the file system 10 of the computer 102 operates to issue to the cache disk 90 of the computer 102 the write command for writing the data on the specified location (13009). The cache disk 90 of the computer 102 operates to write the data (13010) and report the completion of writing the data (13011). When the file system 10 accepts the report on completion of writing the data from the cache disk 90, the file system 10 operates to report the completion of writing the data to the location management unit 801 of the computer 151 (13012).

In receipt of the report on completion of writing the data, the location management unit 801 operates to request the information duplication unit 890 to duplicate the updated data "AAA" on the first location information (that indicates the data "AAA" resident in the cache disk 90 of the computer 101) and the second location information (that indicates the data "AAA" resident in the disk array 201) of the conversion table 811 (14000).

FIG. 14 shows the duplicating process executed by the information duplication unit 890. The information duplication unit 890 operates to issue the read command to the cache disk 90 of the computer 102 where the data "AAA" has been already written (14001), read the data from the cache disk 90 (14002, 14003), issue the write command to the cache disk 90 of the computer 101 and the disk array system 201 at a time (14004), and then write the data therein (14005, 14006, 14005', 14006'). Upon completion of two write command, the information duplication unit 890 operates to report the completion of the duplication to the location management unit 801 (14007). In this embodiment, the location duplication unit 890 is associated with the fibre channel switch 501 and enables to duplicate one data in a plurality of storages at a time. If the information duplication unit 890 enables to duplicate one data merely in one storage, the duplicating process is divided into two processes. In this case, it is presumed that the processing time is made longer. Hence, as the copying targets are increased in number, the duplicating process is made more disadvantageous. In this embodiment, it is preferable to use the information duplication unit 890 that enables to duplicate the data in a plurality of storages.

Returning to FIG. 13, in receipt of the report on completion of the duplication from the information duplication unit 890, the location management unit 801 operates to write the final update date and time in the file history (13014), and set the write bit to "0" (13015), and completes the write (13016, 13017, 13018).

In the system according to the second embodiment, since the disk cache is provided in the host computer, the data that has been just written on the host computer is allowed to be temporarily held. Hence, the access becomes fast. The location management unit operates to select the storage with a few access frequency from the operation ratio measurement unit provided in each storage and then save the data in two or more places. It means that the data is not lost if the host computer is stopped.

In turn, the description will be oriented to the third embodiment of the invention (that is the method of billing the saved data in the storage provider).

FIG. 1 shows a system configuration according to the third embodiment. In the third embodiment, a plurality of clients 70 are connected with the Ethernet 61. The computers 101 and 102 are served as a file server for accepting the request for writing and reading the data from these clients 70. In this embodiment, the description has been expanded on the connection with the clients 70 through the Ethernet 61. In place, the present invention may be implemented without using this connecting means.

In this embodiment, the description has been expanded on the installation of the computers 101 and 102 on the side of the storage service provider. Of course, the computers 101 and 102 may be installed in the sales offices and the branches. If the computer 102 is spaced from the fibre channel switch 501 by 10 km or longer, as illustrated in FIG. 1, the computer 102 is connected with the fibre channel switch 501 through an extender 52 and the ATM (Asynchronous Transfer Mode) 51. In place of the ATM, another connecting means may be used.

Next, the prompting method will be described below. The clients 70 are the terminals prepared in the sales offices and the branches. The user sends out the data to be saved to the computer 101 or 102 through the Ethernet 61. In this case, how the data is saved is specified (the way of saving to be specified for each data is called a data policy). This data holds true to the control information described in the first embodiment. The user would like to save the data with a high access frequency in a fast-access storage or save the data with a low access frequency in an inexpensive storage with a slow access performance. Further, as to the important data, the user also would like to duplicate and save the data in a storage located in a remote place where the data is never lost by something like a disaster even if this is more costly.

Next, the billing will be described below. In the system according to this embodiment, the preserved data is billed on the basis of the saving cost per a volume unit preserved in the attribute preservation unit 80 located for each storage and the data length, the file history and the location information preserved in the conversion table 811 of the location management information. For example, in a case that the data "AAA" is held in the disk array systems 201 and 202 for ten days, the data "AAA" is moved to the disk array system 203 and saved therein for ten days, then, the data is moved to the library system 301 and saved therein for ten days, the data preserving cost of 30 days may be derived by the following expression.

Data preserving cost={(preserving cost 10 of RAID0)×10 days×2+ (preserving cost 15 of RAID5)×10 days+(preserving cost 1 of the library)×10 days}×data length wherein the doubled preserving cost of the RAID0 reflects the doubled preservation of the data in two disk arrays. The location management unit 801 operates to calculate the cost of all the data for each month and then bill the user for it. After calculating the cost, the location management unit 801 operates to erase the information on the movement and the duplication of the data from the file history. The information required for calculating the cost is included in the first and the second embodiments.

As another example, in a case that the data "BBB" is preserved in two DVD-RAM mediums for thirty days and is cached in the disk array system 201 for three days because it is referenced once, the data preserving cost of 30 days may be derived by the following expression.

Data preserving cost={preserving cost 10 of RAID0}×3 days+ (preserving cost 1 of the library)×30 days×2}×data length For calculating the data cost for each user, the WWN is used. For example, in a case that the user A saves the data through the computer 101 and the user B saves the data through the host computer 102, the host computers 102 and 102 have their respective WWNs, so that if the conversion table 811 is retrieved using the WWN of the target host computer, the total data preserving cost of the user who uses the host computer can be calculated.

Then, the adaptation of the global policy will be described below. As mentioned above, the system of this embodiment enables to easily calculate the cost per a data unit. If the user specifies the data preserving cost for each month, the data is required to be moved for meeting the cost. Of course, as the data amount is made larger, the performance is sacrificed more.

This specification is called a global policy against the data policy. The global policy that has precedence over the performance rather than the cost may be considered. The data policy or the global policy may be specified as a precedence. If the precedence is given to the data policy and the data preserving cost (global policy) specified by the user cannot be met, the fact is reported to the user. Normally, the setting of the global policy is notified from the user-side client 70 to the computer 151 through the host computer 101 or 102. In place, the administrator on the side of the storage service provider enables to set the global policy to the computer 151 on the basis of the setting reference of the global policy to be exchanged between the user and the storage service provider through a document.

In the system according to the third embodiment, the data requested by the user to be preserved may be managed in location more fine on the basis of the control information specified by the user and through the attribute preservation unit, the location management unit and the information duplication unit. This makes it possible to associate the cost taken in preserving the data with the activity and the reliability of the data and thereby for the user to allocate the high preserving cost to the data for requiring the high activity and reliability and the low preserving cost to the data of the low activity and reliability. In general, though the data requiring the high activity is small in amount, the system of this embodiment enables to associate the activity and the reliability of the data with the cost, thereby allowing the user to reduce the data preserving cost as a whole.

As described above, according to the invention, the location management unit operates to move the data and reproduce the data on the basis of the operation ratio of the storage, the access frequency of the data, the control information, and the billing information, thereby making it possible to perform the data saving in correspondence with the performance, the reliability, the preservation, and the cost. Further, by concentratively managing the locations of the data resident in a plurality of computers and a plurality of storages, it is not necessary to notify each computer of the movement of the data. Further, since the information duplication unit enables to duplicate a plurality of data units at a time, even if the number of computers are large, it is possible to reduce the time taken in reproduction.

What is claimed is:

1. A method for providing a storage area in an information processing system having a plurality of storages, for providing each of users with the storage area of a storage, comprising the steps of:

accepting data to be saved and control information for specifying how the data is saved from the user through a network;

receiving attribute information representing what kind of storage is to be saved;

specifying one of said storages in which data is to be stored in accordance with said attribute information and said control information; and saving said data in said one of said storages.

2. A method for providing a storage area according to claim 1, further comprising:

accepting Previously presented control information through said network;

specifying another one of said storages based on said attribute information and said Previously presented control information; and either duplicating or moving said data from said one of said storages to said other one of said storage.

3. A method for providing a storage area in an information processing system having a plurality of storages, for providing each of users with a storage area of a storage, comprising the steps of:

accepting data to be saved and control information for specifying how said data is saved from the user through the network;

receiving attribute information indicative of a storage to use for storing said data;

specifying a first storage among said storages in accordance with said attribute information and said control information;

saving said data in said first storage;

accepting Previously presented control information from said network;

specifying a second storage from among said storages in accordance with said attribute information and said Previously presented control information;

either duplicating or moving said data from said first storage to said second storage; and billing said user according to said attribute information of said first storage, history information indicating in which one of said storages said data is saved and a period when said data is saved.

4. A method for providing a storage area according to claim 3, wherein said attribute information indicates preserving price per unit volume of said storage for saving said data.

5. An information processing system comprising:

a plurality of storages for storing data;

one or more controllers for writing information in or reading information from said storages;

location management means for managing a location of data stored in said storages; and attribute preservation means for preserving attribute information representing an attribute of each of said storages;

wherein in a case one of said one or more controllers writes information in said storages, said location management means specifies one of said storages in which data is to be stored in accordance with said attribute information and with control information which is designated by said one of said controllers, said control information indicating how data is to be stored, said data received from said one of said controllers being written to said one of said storages, said location management means further preserves information relating to said one of said storages and a location of said data as stored in said one of said storages.

6. An information processing system as claimed in claim 5, wherein said attribute information relates to a cost required for reserving data in said storages.

7. An information processing system as claimed in claim 6, wherein said location management means issues an attribute information acquisition request to each of said storages to obtain said information relating to said cost, said one of storages being selected based on said information.

8. An information processing system as claimed in claim 6, wherein said location management means issues an attribute information acquisition request to said each storages to obtain said information relating to said performance, said one of storages being selected based on said information.

9. An information processing system as claimed in claim 5, wherein said attribute information relates to a performance of said storages.

10. An information processing system as claimed in claim 5, wherein said control information includes indicator information representing how data is stored, said indicator information including "fast", "highly reliable", "long term", "inexpensively", "for disaster recovery", "temporarily", "in parallel", and "portably".

11. An information processing system comprising:

a plurality of storages;

one or more controllers for writing data in or reading data from said storages;

location management means for managing a location of data stored in said storages;

attribute preservation means for preserving attribute information representing an attribute of each of said storages;

control information preservation means for preserving control information which indicates how data received from said controller is to be stored; and changing means for changing said control information within said control information preservation means, wherein when said changing means changes first control information, said location management means determines a first storage from among said storages, wherein data that is associated with said first control information is stored in said first storage either by being duplicated from its current location or moved from its current location, said data being stored in accordance with attribute information of said first storage and in accordance with said first control information.

12. An information processing system as claimed in claim 11, wherein said attribute information relates to a cost required for reserving data in said storages.

13. An information processing system as claimed in claim 12, wherein said location management means issues an attribute information acquisition request to each of said storages to obtain said information relating to said cost, said first storage being determined based on said information.

14. An information processing system as claimed in claim 11, wherein said attribute information relates to a performance of said storages.

15. An information processing system as claimed in claim 14, wherein said location management means issues an attribute information acquisition request to each of said storages to obtain said information relating to said performance, said first storage being determined based on said information.

16. An information processing system as claimed in claim 11, further comprising history preservation means for preserving information as to said first storage, and a time period during which said data is to be stored.

17. An information processing system as claimed in claim 11, wherein said control information includes indicator information representing how data is stored, said indicator information including "fast", "highly reliable", "long term", "inexpensively", "for disaster recovery", "temporarily", "in parallel", and "portably".

* * * * *